W. E. KISER.
AUTOMOBILE STEERING CLAMP.
APPLICATION FILED JAN. 5, 1917.

1,319,875.

Patented Oct. 28, 1919.

WITNESSES
Arthur K. Moore

INVENTOR
William E. Kiser
BY Richard B. Owen
ATTORNEY

UNITED STATES PATENT OFFICE.

WILLIAM E. KISER, OF STANBERRY, MISSOURI.

AUTOMOBILE STEERING-CLAMP.

1,319,875. Specification of Letters Patent. Patented Oct. 28, 1919.

Application filed January 5, 1917. Serial No. 140,788.

*To all whom it may concern:*

Be it known that I, WILLIAM E. KISER, a citizen of the United States, residing at Stanberry, in the county of Gentry and State of Missouri, have invented certain new and useful Improvements in Automobile Steering-Clamps, of which the following is a specification.

This invention relates to an automobile steering clamp and the primary object of the invention is to provide a device adapted to be attached to the steering column of an automobile and connected to the spokes of the steering wheel so that the free and easy movement of the steering wheel will be diminished whereby the driver of the automobile will not find it necessary to retain a firm and steady grip on the wheel while operating the automobile.

It is well known that in some types of automobiles, the steering mechanism is so arranged and associated with the steering wheel whereby the steering wheel will turn at the slightest inclinations occasioned by a slight obstruction to the wheels in the roadway. This requires the operator to retain a firm and steady grip on the steering wheel and when turning corners it is necessary to be careful that the steering wheel is not turned too great a distance and this operation becomes difficult if the machine is traveling above ordinary rate of speed.

The steering wheel clamp herewith presented and described is associated with the steering column and the steering wheel so that a friction is created by virtue of the engagement of the clamp with the steering column and this friction is the means of offering a resistance to the steering wheel when the same is to be turned whereby it will not be so free in its movement.

The invention also has for another one of its objects to provide a clamp of this character that may be adjusted so that the frictional engagement of the clamp with the steering column may be increased or diminished to suit the operator.

A further object of this invention is the provision of an automobile steering clamp which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
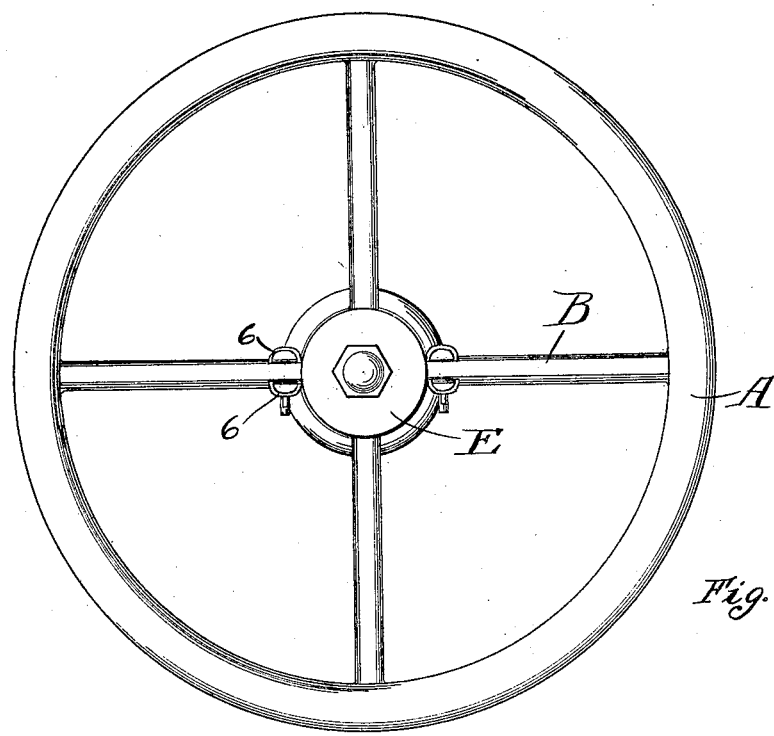
Figure 1 is a plan view of the steering wheel showing my invention applied thereto.
Figure 2:
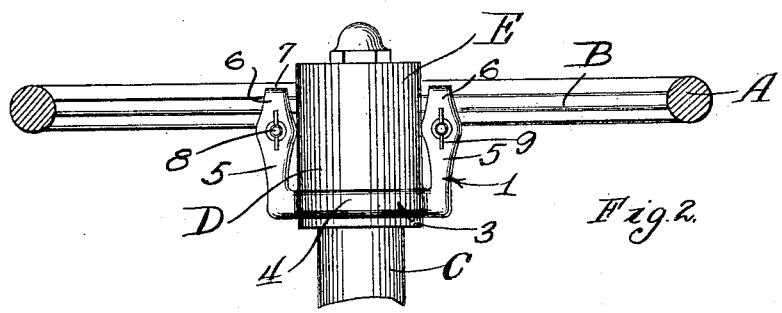
Fig. 2 is a section through the wheel showing the manner of attaching the device to the wheel and steering column.

Referring to the drawing, wherein is illustrated the preferred form of my invention, and in which like numerals of reference indicate corresponding parts throughout the several views, the steering wheel A is provided with the usual spokes B and is attached to the steering column C in the usual manner. In this instance I have illustrated the steering column as being provided with an enlarged end D which contracts with the hub E of the steering wheel, the latter being mounted on the end of the steering column for turning the steering mechanism in the usual manner.

The clamp comprises two co-acting sections 1 and 2 and each section includes a semi-circular portion 3. When these semi-circular portions are assembled together they provide a clamp ring 4 adapted to snugly fit around the enlarged portion D of the steering column. In this connection, it is pointed out, that this portion of the steering column is immovable, the operating rod being arranged within the column and connection to the steering mechanism and to the steering wheel.

Figure 3:
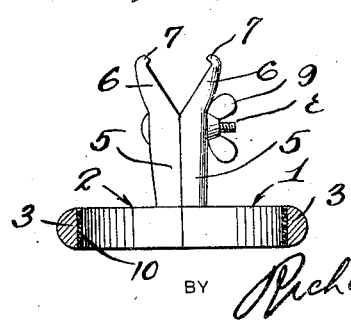
Fig. 3 is a cross section through the clamp.

Each terminal of each semi-circular portion 3 is provided with an arm 5 and when the semi-circular portions are assembled to form the ring 4 these arms will be arranged in pairs which contact with each other when the ring is clamped to the steering column. The ends of the arms are provided with angularly disposed gripping fingers 6 having their terminals provided with lugs 7 as clearly shown by Fig. 3 of the drawing. This construction permits one of the spokes of the steering wheel to be received between each pair of members 6 whereby the clamp may be attached to the steering wheel. Each pair of arms 5 is provided with alined openings through which a fastening bolt 8 is extended and provided with a wing-nut 9 for clamping the arms 5 together so that the gripping fingers 6 may be clamped tightly with the spokes of the steering wheel.

The engaging surface of the clamp ring 4 is provided with a suitable lining 10 of felt which will frictionally engage the steering column when the ring is turned by the operation of the steering wheel.

In use, the device will be mounted upon the steering column and steering wheel in the above described manner and if the steering wheel is inclined to move freely, this free movement will be greatly diminished by reason of the tight engagement of the clamp 4 with the steering column. Now, when the steering wheel is turned, the tight frictional engagement with the lining 10 of the ring 4 with the steering column will offer a resistance to the movement which the operator imparts to the steering wheel thereby obviating the necessity of retaining such a firm and steady grip on the wheel when operating the steering mechanism.

From the foregoing it will be observed that a very simple and durable automobile steering clamp has been provided, the details of which embody the preferred form. I desire it to be understood however, that slight changes in the minor details of construction may be made without departing from the spirit of the invention or the scope of the claims hereunto appended.

I claim:

1. The combination with a steering wheel mounted upon a steering column, and means associated with the steering column and connected to the steering wheel for offering a resistance to the movement imparted to the steering wheel.

2. The combination with a steering wheel mounted upon a steering column, means frictionally engaged with the steering column, and means connecting the said means with the said steering wheel whereby the rotation of the steering wheel will be impeded by the said first mentioned means when a movement is imparted to the said wheel.

3. The combination with a steering wheel mounted upon a steering column, a ring clamped upon the said steering column, means connecting the ring with the steering wheel and adapted to be turned with the steering wheel for turning the said ring on the steering column when the wheel is turned.

4. The combination with a steering wheel mounted upon a steering column, a ring clamped upon the said steering column, means connecting the ring with the steering wheel and adapted to be turned with the steering wheel for turning the said ring on the steering column when the wheel is turned, and a lining for the said ring frictionally engaged with the said column.

5. The combination with a steering wheel mounted upon the steering column, clamping elements fastened to the spokes of the steering wheel, and means carried by the clamping element and embracing the said steering column for offering a resistance to the movement imparted to the steering wheel.

6. The combination with the steering wheel mounted upon the steering column, of a ring clamped upon the steering column and including two semi-circular sections, means for clamping the sections together and for clamping the said ring to the steering wheel spokes, and a lining interposed between the said semi-circular sections and the said column.

7. A retarder for steering mechanism, comprising, in combination with a steering post and hand wheel, a brake surface on the post, and a brake member attached to and movable with the hand wheel, and having frictional contact with the brake surface on the post, for the purpose set forth.

8. The combination with a fixed part of the steering mechanism and the steering wheel of a motor car, of a stabilizer comprising two semi-circular members fitting around the said fixed part and clamped yieldingly thereon, and a plurality of arms interlocked with the steering wheel to prevent too free turning movement thereof.

9. The combination with a fixed part of the steering mechanism and the steering wheel of a motor car, of a stabilizer comprising two semi-circular members fitting around the said fixed part and each provided with a pair of upwardly-projecting arms terminating in hook-shaped ends, the juxtaposed arms of the said members engaging opposite sides of arms or spokes of the steering wheel, and clamping devices for drawing the juxtaposed arms of said members together to clamp the latter firmly on said fixed part to prevent too free movement of the steering wheel.

10. A retarder for steering mechanism comprising, in combination with a steering post, and hand wheel, a brake surface on the post, a brake member attached to and movable with the hand wheel, and means for adjusting the tension of the brake member.

11. A device for imparting a drag or friction to the steering wheel of an automobile including two mating sections, each section including a semi-circular band portion, a band of suitable friction material within said semi-circular band portion for immediate contact with a stationary member of the steering mechanism of an automobile, each section also including a pair of projecting arms or members terminating in clamping portions for immediate contact with the arms of the spider of the steering wheel, fastening means in each mating pair of said arms or members disposed intermediate the clamping portions thereof and the said semicircular band portions thereof for adjustment of said band portions to regulate the frictional contact between the same and a stationary member of the steering mechanism, substantially as described.

12. A friction steering device for automobiles including a pair of mating members, each of which includes a semi-circular portion and a pair of projecting arms or members, said arms or members terminating in the clamping portion for immediate contact with the arms of the spider of the steering wheel, the semi-circular portion of each member being arranged for immediate contact with the stationary member of the steering mechanism of an automobile, and means on said sections for adjusting the same with relation to the stationary member of the steering mechanism.

13. A friction steering device including a pair of sections, one portion of which is formed for immediate contact with a stationary member of the steering mechanism of an automobile, the other portion of which is formed for immediate contact with the steering wheel of an automobile and means for adjusting the sections to increase the frictional contact between the said sections and a stationary member of the steering mechanism.

14. The combination with a fixed part of the steering mechanism of a motor car and the steering wheel of said car, of a friction clutch stabilizer yieldingly clamped on said fixed part and secured to said wheel to turn therewith.

15. A retarder for steering mechanism, comprising, in combination with a steering post having a case thereon, a hand wheel, a band frictionally mounted on the case and means including a clamp for attaching said band to the hand wheel and means for adjusting tension of the band.

In testimony whereof I affix my signature in presence of two witnesses.

WILLIAM E. KISER.

Witnesses:
S. M. Hinkley,
E. E. Sanford.